United States Patent

Franck et al.

(10) Patent No.: US 7,724,806 B2
(45) Date of Patent: May 25, 2010

(54) INTERFERER DIVERSITY

(75) Inventors: Jeff Franck, Everett, WA (US); William Keese, Kirkland, WA (US)

(73) Assignee: Motorola, Inc., Schaumburg, IL (US)

( * ) Notice: Subject to any disclaimer, the term of this patent is extended or adjusted under 35 U.S.C. 154(b) by 823 days.

(21) Appl. No.: 11/643,747

(22) Filed: Dec. 20, 2006

(65) Prior Publication Data

US 2008/0152054 A1    Jun. 26, 2008

(51) Int. Cl.
*H04L 27/30* (2006.01)
(52) U.S. Cl. .................. 375/148; 375/346; 375/349; 455/182.1; 455/207; 455/303
(58) Field of Classification Search .................. 375/147, 375/148, 267, 340, 346, 347, 349, 355; 455/192.2, 455/182.1, 207, 209, 225, 296, 303; 329/302, 329/306, 318, 323, 324, 346, 349, 358, 359
See application file for complete search history.

(56) References Cited

U.S. PATENT DOCUMENTS

| | | | |
|---|---|---|---|
| 5,239,694 A * | 8/1993 | Toyoshima | 455/115.4 |
| 5,852,784 A * | 12/1998 | Ito et al. | 455/552.1 |
| 6,215,430 B1 | 4/2001 | Smith et al. | |
| 6,226,505 B1 * | 5/2001 | Uda | 455/255 |
| 6,574,459 B1 | 6/2003 | Kaminski et al. | |
| 7,573,398 B2 * | 8/2009 | Hoctor et al. | 340/870.12 |
| 2002/0047942 A1 | 4/2002 | Vorenkamp et al. | |
| 2002/0106041 A1 * | 8/2002 | Chang et al. | 375/347 |
| 2004/0161062 A1 | 8/2004 | Richey et al. | |

* cited by examiner

*Primary Examiner*—Dac V Ha (57) ABSTRACT

Providing interferer diversity is disclosed. A received wireless signal is processed to obtain a first processed signal in which a desired information is translated to a first frequency in a first Nyquist zone. The received wireless signal processed to obtain a second processed signal in which the desired information is translated to a second frequency in the first Nyquist zone. The second frequency is different than the first frequency.

26 Claims, 8 Drawing Sheets

INTERFERER DIVERSITY

BACKGROUND

When trying to receive a desired radio signal, one or more undesired signals/noise may interfere with the desired signal. The interference makes it difficult to receive the desired signal. Filters have been used to remove the undesired signals/noise, but in many cases filters cannot completely reject all interferers, e.g., those that are in the desired frequency band, close in frequency, or have spurious products generated during processing that are close in frequency, to the desired signal.

"Interferer diversity" has been used to minimize the impact of interference, e.g., from one or more interference sources or "interferers". Interferer diversity refers to minimizing the impact that an interferer or group of interferers has on receiving the desired signal. To date, however, interferer diversity typically has been achieved by using different receiver/antenna combinations or by frequency hopping, which may not be practical or desirable in all cases. Therefore there exists a need to improve interferer rejection.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Radio receiver diversity is disclosed. In some embodiments, a received radio signal is mixed with a first local oscillator (LO) in a first receiver. The received signal is mixed with a second LO in a second receiver. The first LO and the second LO are associated with different LO frequencies, resulting in the received radio signal being shifted to different intermediate frequencies (IF) in the first receiver from the second receiver. Given the same sampling frequencies on both receivers, the resulting frequency translation to the first Nyquist zone (frequencies between 0 Hz and half of sampling frequency) will differ between both receivers. By selecting a better sampling result and/or combining the sampling results, interferer diversity is provided. In some embodiments, the first and the second LO frequencies are the same, and both receivers are associated with different sampling frequencies, resulting in different frequency translation to the first Nyquist zone. In some embodiments, the first and the second LO frequencies are different, and receivers are associated with different sampling frequencies.

Figure 1:
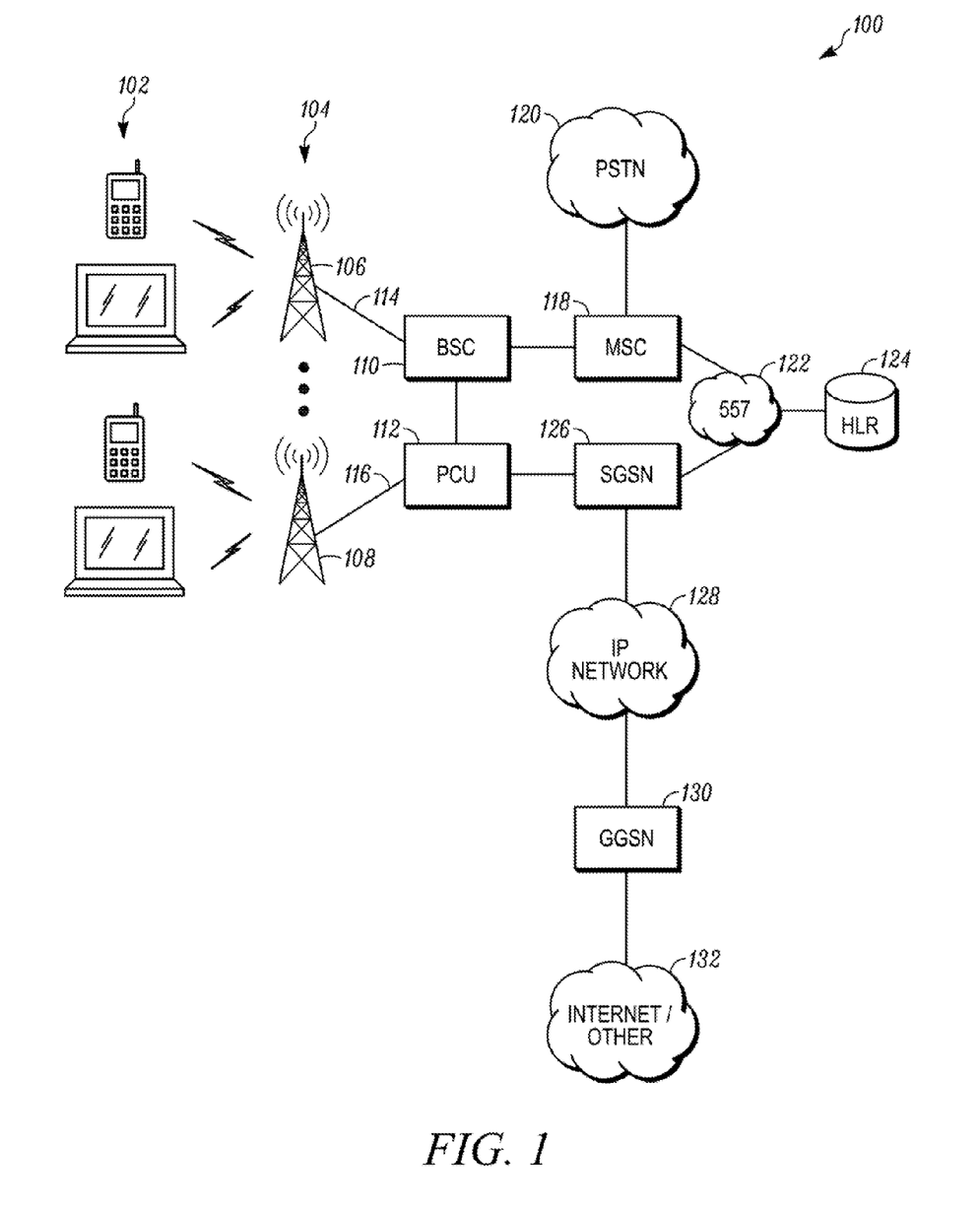
FIG. 1 is a block diagram illustrating elements of a typical mobile telephone network.

FIG. 1 is a block diagram illustrating elements of a typical mobile telephone network. In the example shown, mobile telephone network (e.g., iDEN or GSM) 100 includes a plurality of mobile devices 102 connected via base stations 104, represented in FIG. 1 by BTS 106 and BTS 108, to a base station controller (BSC) 110. The BSC 110 has a packet control unit 112 associated with it, for handling non-voice network data communication (e.g., GPRS) packets. The BTS's are connected to the BSC via Abis links 114 and 116, respectively. The Abis interface is a standards-based interface that typically includes one or more elements and/or requirements that are specific and typically proprietary to an original equipment manufacturer (OEM) and/or other vendor of the BSC. Typically, the Abis interface/link is carried over a dedicated and private T-1/E-1 line. In the example shown, the BSC 110 is connected to a mobile switching center 118, to which the BSC 110 is configured to route inbound voice data received from mobile equipment via a BTS and from which the BSC 110 is configured to receive outbound voice data. The MSC 118 connects to traditional telephone equipment and other networks via the public switched telephone network (PSTN) 120. The MSC 118 is connected via an SS7 (or other) network 122 to a home location register (HLR) 124 used to store subscriber data. To handle non-voice packet (e.g., GPRS) data, the PCU 112 is connected to an SGSN 126. In the example shown SGSN 126 is connected via SS7 network 122 to HLR 124. SGSN 126 is also connected via an IP network 128 and a GGSN 130 to the Internet (or other external packet data network) 132.

Figure 2:
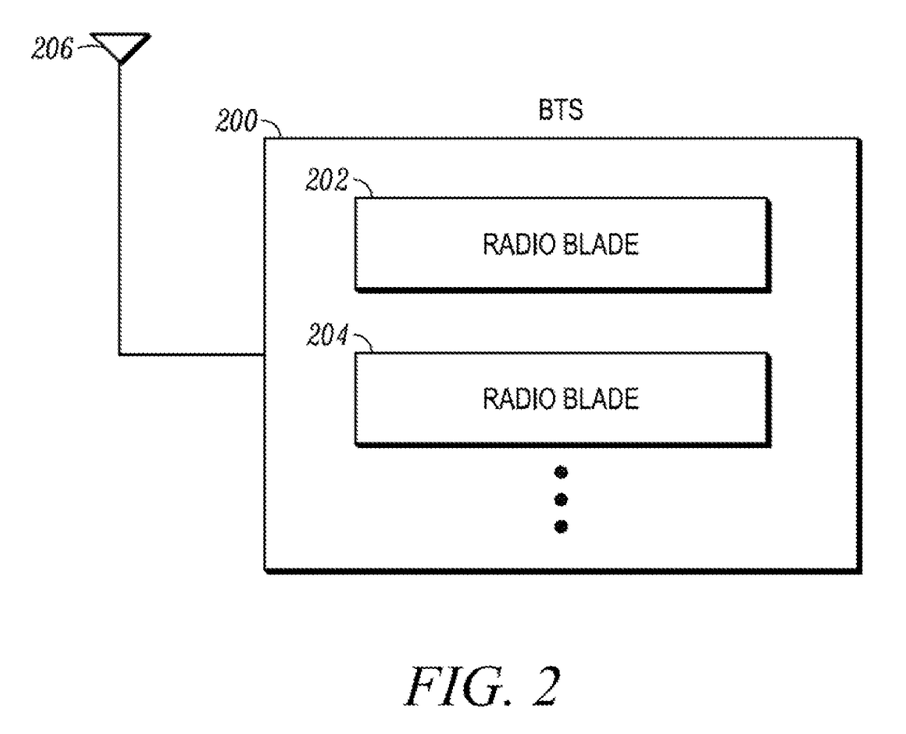
FIG. 2 is a block diagram illustrating elements of a mobile base station (BTS).

FIG. 2 is a block diagram illustrating elements of a mobile base station (BTS). In some embodiments, the base station is the BTS 106 and/or BTS 108 of FIG. 1. BTS 200 includes one or more radio blades (or other radio resources), represented in FIG. 2 by radio blade 202 and radio blade 204. For example, BTS 200 includes one or more electrical component slots for attaching one or more interchangeable radio blades with radio components. Radio blades 202 and 204 each includes one or more radio transceivers. Each radio transceiver may include different components and/or may be associated with different configurations. For example, at least two of the transceivers are associated with different local oscillator (LO) frequencies. In some embodiments, each transceiver can be configured individually. Antenna 206 is connected to BTS 200. Antenna 206 is used by one or more of the transceivers for sending and/or receiving signals. In some embodiments, BTS 200 is connected to a plurality of antennas. For example, each radio blade of BTS 200 is connected to a different antenna, and transceivers of each radio blade share the connected antenna.

Figure 3A:
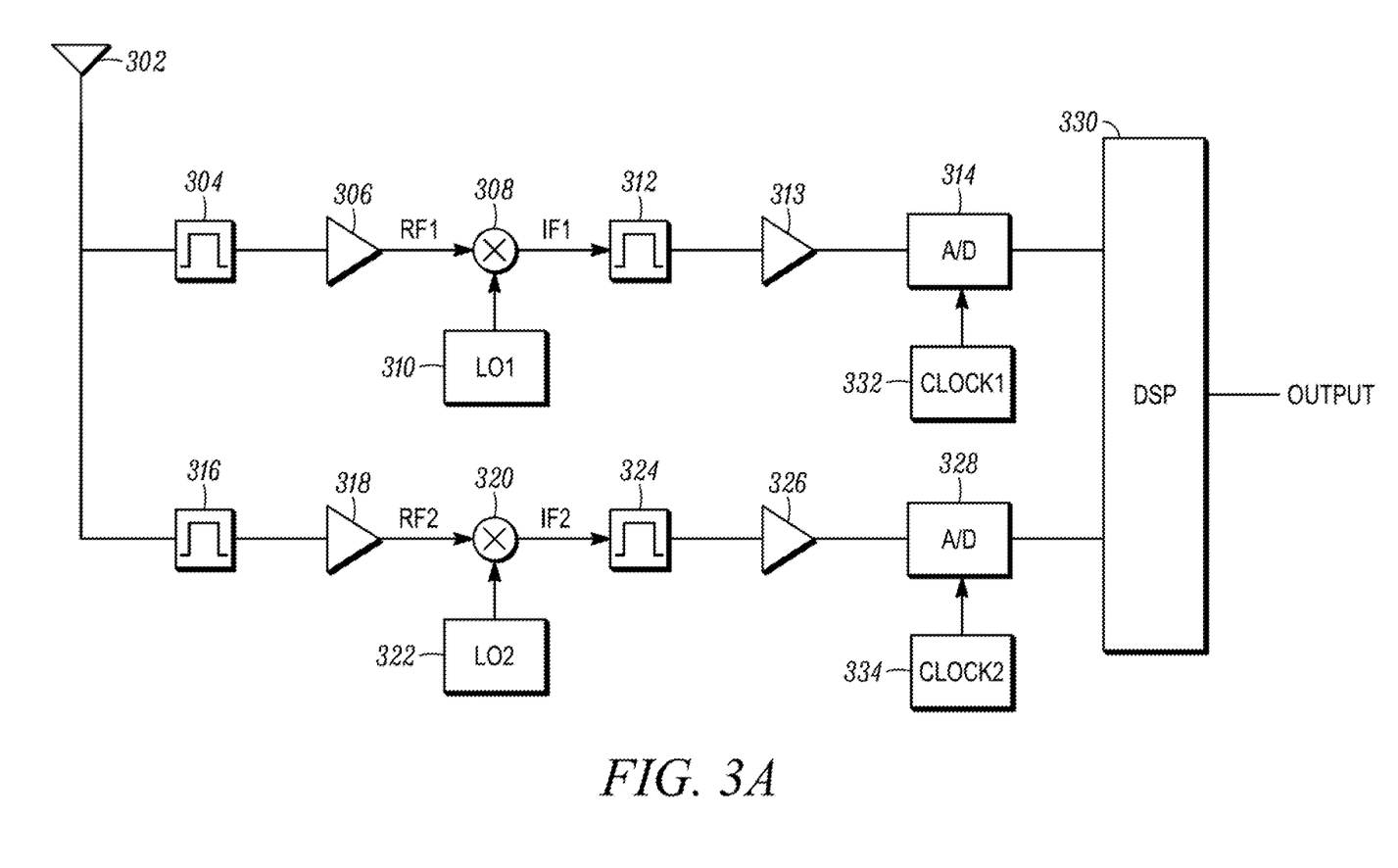
FIG. 3A is a diagram illustrating an embodiment of receivers with different local oscillator frequencies.

FIG. 3A is a diagram illustrating an embodiment of receivers with different local oscillator frequencies. In some embodiments, the receivers of FIG. 3A are included in BTS 200 of FIG. 2. Antenna 302 receives a radio signal including a desired signal. In some embodiments, antenna 302 is antenna 206 of FIG. 2. In some embodiments, multiple antennas are used to receive the desired signal. Two receivers are shown in the example. In some embodiments, more than two receivers are used. A first receiver includes filter 304, amplifier 306, mixer 308, local oscillator (LO) 310, filter 312, amplifier 313, and converter 314. A second receiver includes filter 316, amplifier 318, mixer 320, local oscillator (LO) 322, filter 324, amplifier 326, and converter 328. Digital signal processor (DSP) 330 processes output from converter 314 and converter 328. Filters 304, 312, 316, and 324 include one or more of the following types of filters: a band-pass filter, a low pass filter, and a high pass filter. For example, a band-pass filter is used to filter out interfering noise and reduce aliasing during signal sampling. In some embodiments, filter 304 and 316 are the same filter. In some embodiments, amplifier 306 and 318 are the same amplifier. For example, the antenna received signal is filtered and amplified by a single filter and amplifier before being split into inputs of mixer 308 and mixer 320.

Tuning different receivers and/or portions thereof to different frequencies to achieve interferer diversity is disclosed. In some embodiments, LO 310 and LO 322 are set to different frequencies to provide diversity between the output of the first receiver and output of the second receiver. The different LO frequencies of LO 310 and LO 322 causes the amplified inputs of mixer 308 and mixer 320 to be shifted to different frequencies. Each of converters 314 and 328 includes an analog-to-digital (A/D) converter. For example, the output of amplifier 313 and amplifier 326 are inputs to the same converter. In some embodiments, converter 314 and/or converter 328 is included in DSP 330. In some embodiments, converter 314 and/or converter 328 undersample (Harmonic Sampling) the signal provided as input to the converter. When the input signal frequency ($f_a$) is greater than half of the sampling frequency ($f_s$), the input signal is still translated (e.g., mapped) into the first Nyquist zone. By using different LO frequencies (e.g., 1 MHz apart) to shift the input signals into converters 314 and 328 to be different frequencies, the signals are translated to unique frequencies in the first Nyquist zone.

In some cases, the output of one converter may be better than the output of the other converter. In some embodiments, DSP 330 determines which converter output has superior signal quality (e.g. converter output signal with higher signal-to-noise ratio or converter output signal with higher/lower power) and outputs the corresponding desired signal. In some embodiments, DSP 330 combines at least a portion of outputs of both converter 314 and converter 328 to determine desired information carried in the signal received at antenna 302.

In the above example, the receivers are tuned to different frequencies by setting LO1 and LO2 to different frequencies. In some embodiments, the received signals are tuned to different first Nyquist zone frequencies by using different sampling rates for converters 314 and 328. For example, sampling clock 332 is at least in part used by converter 314 to achieve a first sample rate, and sampling clock 334 is at least in part used by converter 328 to achieve a second sampling rate. In some embodiments, the output frequency oscillator 310 is same as the output frequency of oscillator 322, and the first sampling rate is different from the second sampling rate. In some embodiments, the output frequency oscillator 310 is different from the output frequency of oscillator 322, and the first sampling rate is same as the second sampling rate. In some embodiments, output frequency of oscillator 310 is different from output frequency of oscillator 322 and the first sampling rate is different from the second sampling rate. In other embodiments, one or more other components having a tunable frequency are set in one receiver or portion thereof to a different frequency/rate than a corresponding component(s) in another receiver or corresponding portion thereof to provide interferer diversity.

Figure 3B:
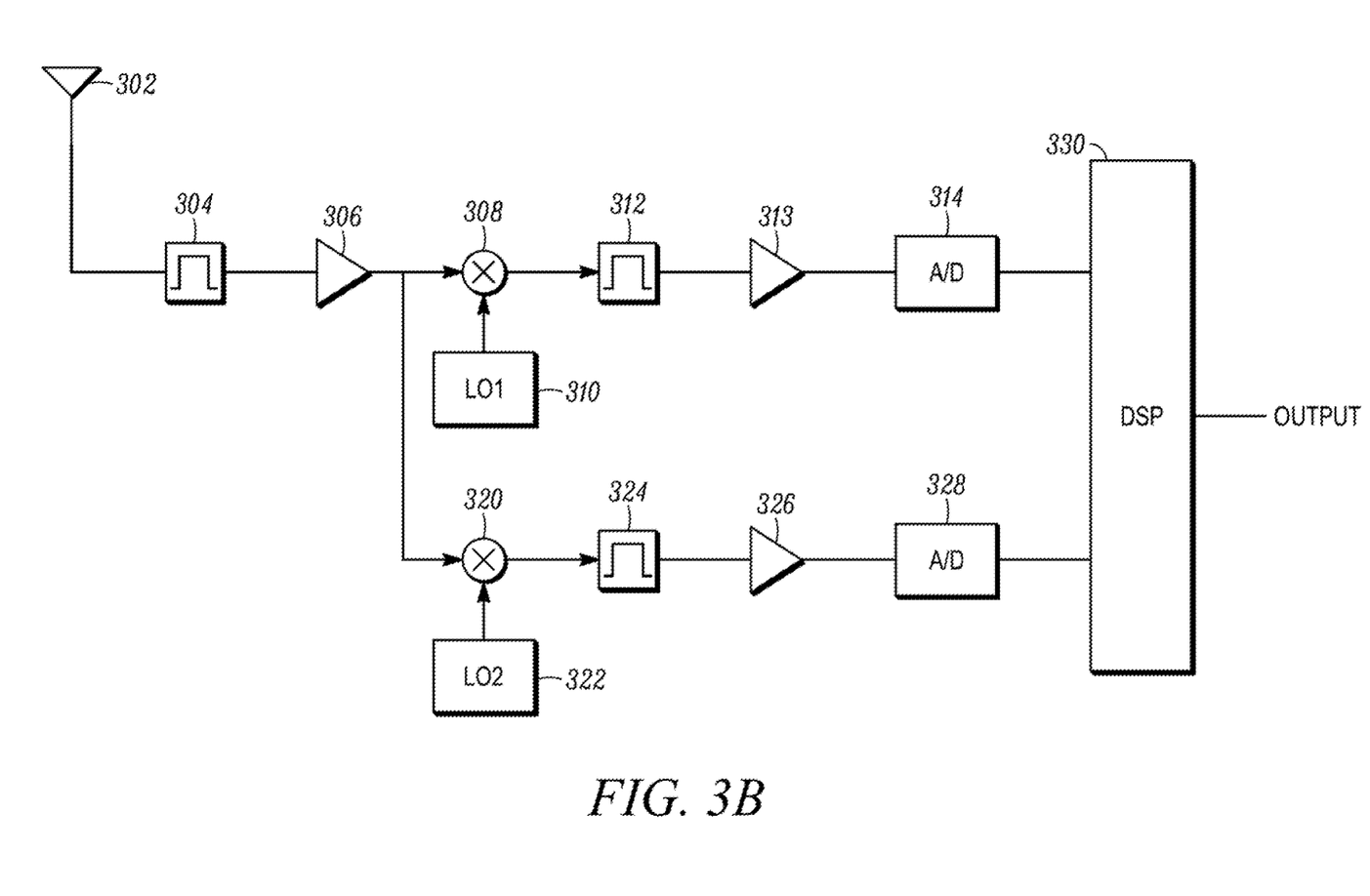
FIG. 3B is a diagram illustrating an embodiment of a single receiver that provides diversity by using a plurality of LO frequencies.
Figure 3C:
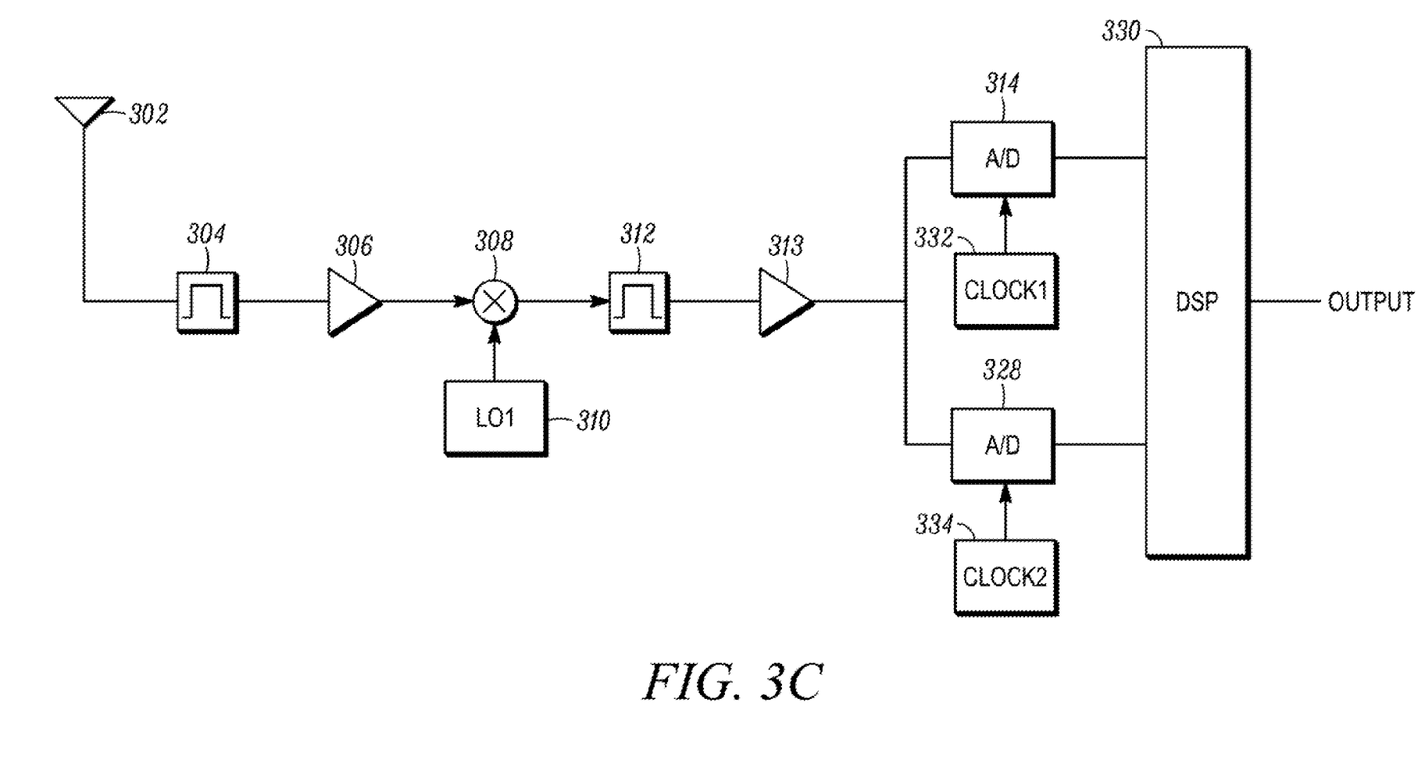
FIG. 3C is a diagram illustrating an embodiment of a single receiver that provides diversity by using a plurality of sampling clocks.

In some embodiments, at least one component of the first receiver and at least one component of the second receiver are located on different radio blades of BTS 200 shown in FIG. 2. In some embodiments, at one component of the first receiver and at least one component of the second receiver are located on different transceiver radios on a single radio blade of BTS 200 shown in FIG. 2. For example, if BTS 200 of FIG. 2 includes an unused transceiver radio, the unused transceiver radio is used to provide diversity as described above. In some embodiments, more than two different LO frequencies are used to provide diversity. FIG. 3B is a diagram illustrating an embodiment of a single receiver that provides diversity by using a plurality of LO frequencies. FIG. 3C is a diagram illustrating an embodiment of a single receiver that provides diversity by using a plurality of sampling clocks.

Figure 4:
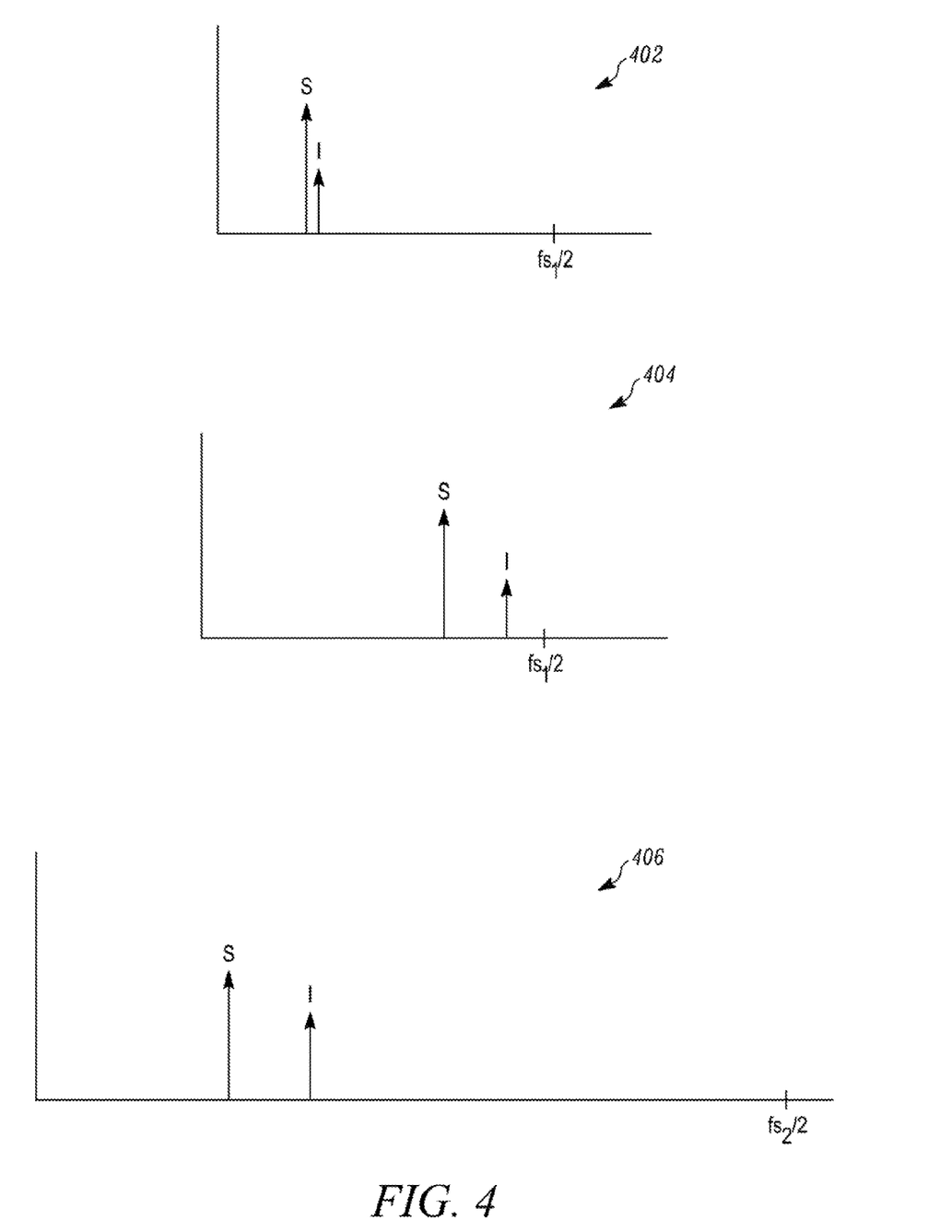
FIG. 4 is a diagram illustrating examples of frequency vs. intensity graphs of the first Nyquist zone after sampling an input signal.

FIG. 4 is a diagram illustrating examples of frequency vs. intensity graphs of the first Nyquist zone after sampling an input signal. Graph 402 shows the input signal mixed using a first local oscillator frequency (e.g., frequency of LO 310 of FIG. 3A) and sampled using a first sampling rate (e.g., sampling rate associated with clock 332 of FIG. 3A) to produce an output including desired signal (S) and an interferer (I). Since the desired signal and the interferer have been translated (e.g., mapped) close together in the first Nyquist zone, it could be difficult to reject the interferer (I) when extracting the desired signal (S).

Graph 404 shows the input signal mixed using a second local oscillator frequency (e.g., frequency of LO 322 of FIG. 3A) and sampled using the first sampling rate (e.g., the same sampling rate associated with graph 402). By mixing the input signal using a different local oscillator frequency than graph 402, the desired signal and the interferer are translated to different frequencies in the first Nyquist zone. Since the desired signal and the interferer have been translated further apart in graph 404 than in graph 402, the output associated with graph 404 is more desirable than the output associated with graph 402. If the outputs of graphs 402 and 404 are both available on a communication device, interferer diversity can be used to select the output associated with graph 404 to provide a more desirable output.

Graph 406 shows the input signal mixed using the first local oscillator frequency (e.g., the same local oscillator frequency associated with graph 402) and sampled using a second sampling rate (e.g., sampling rate associated with clock 334 of FIG. 3A). By sampling the input signal using a different sampling rate than graph 402, the desired signal and the interferer are translated to different frequencies in the first Nyquist zone. Since the desired signal and the interferer have been translated further apart in graph 406 than in graph 402, the output associated with graph 406 is more desirable than the output associated with graph 402. If the outputs of graphs 402 and 406 are both available on a communication device, interferer diversity can be used to select the output associated with graph 406 to provide a more desirable output.

Figure 5:
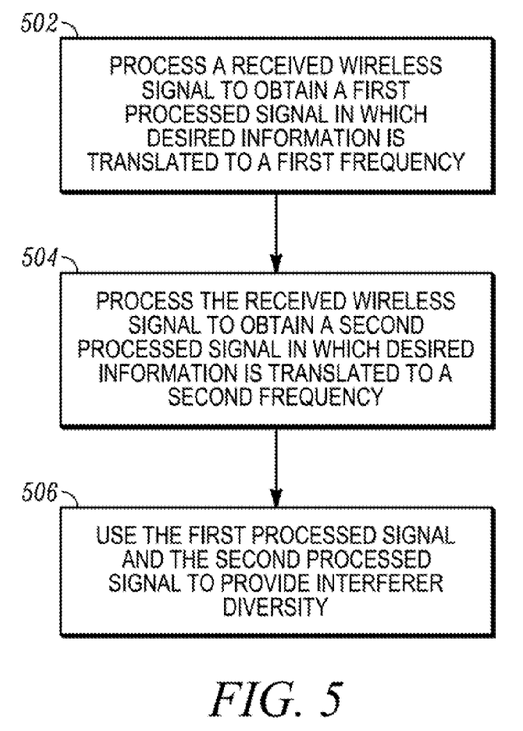
FIG. 5 is a flowchart illustrating an embodiment of a process of achieving interferer diversity.

FIG. 5 is a flowchart illustrating an embodiment of a process of achieving interferer diversity. In some embodiments, the process of FIG. 5 is implemented in BTS 200 of FIG. 2. At 502, a received wireless signal is processed to obtain a first processed signal in which a desired information is translated to a first frequency in the first Nyquist zone. The processing includes mixing the received wireless signal using a first LO frequency and/or sampling the received wireless signal using a first sampling rate. At 504, the received wireless signal is processed to obtain a second processed signal in which the desired information is translated to a second frequency in the first Nyquist zone which is different than the first frequency. The processing includes mixing the received wireless signal using a second LO frequency different than the first LO frequency and/or sampling the received wireless signal using a second sampling rate different than the first sampling rate. In some embodiments, by translating the desired information to different frequencies in the processed signals, the signal-to-noise ratio in one processed signal may be better than the other signal. For example, an interferer that may interfere with the desired information if it is translated to different frequencies with respect to the desired information frequency in each of the processed signals. At 506, interferer diversity is achieved using the first processed signal and the second processed signal. In some embodiments, achieving diversity by selecting one of the processed signals as the desired signal based on signal quality. For example, the processed signal with a higher signal-to-noise ratio is selected. In some embodiments, providing diversity includes combining at least a portion of at least two processed signals to determine desired information contained in the received signal.

Figure 6:
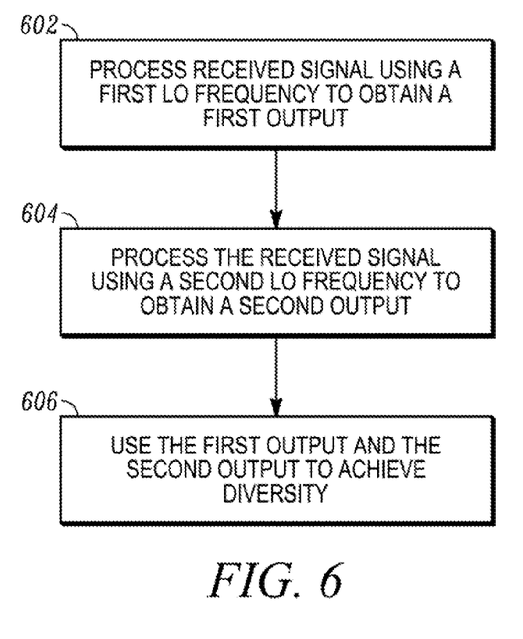
FIG. 6 is a flowchart illustrating an embodiment of a process for processing a received signal using different LO frequencies.

FIG. 6 is a flowchart illustrating an embodiment of a process for processing a received signal using different LO frequencies. In some embodiments, the process of FIG. 6 is included in the process of FIG. 5. In some embodiments, the process of FIG. 6 is implemented in BTS 200 of FIG. 2. At 602, a received signal is processed using a first LO frequency to obtain a first output. In some embodiments, the received signal is a mobile communication carrier signal. Processing the received signal includes mixing the received signal to a first intermediate frequency (IF). In various embodiments, processing the received signal includes performing one or more of the following: filtering the received signal, amplifying the received signal, and converting the received signal. At 604, the received signal is processed using a second LO frequency to obtain a second output. Processing the received signal includes mixing the received signal to a second intermediate frequency (IF). In various embodiments, processing the received signal includes performing one or more of the following: filtering the received signal, amplifying the received signal, and converting the received signal. At 606, the first output and the second output are used to achieve diversity. In some embodiments, achieving diversity by selecting the first or the second output as the desired output based on signal quality. For example, the first or the second output with a higher signal-to-noise ratio is selected. In some embodiments, achieving diversity includes combining at least a portion of the first output and the second output to determine desired information contained in the received signal.

Figure 7:
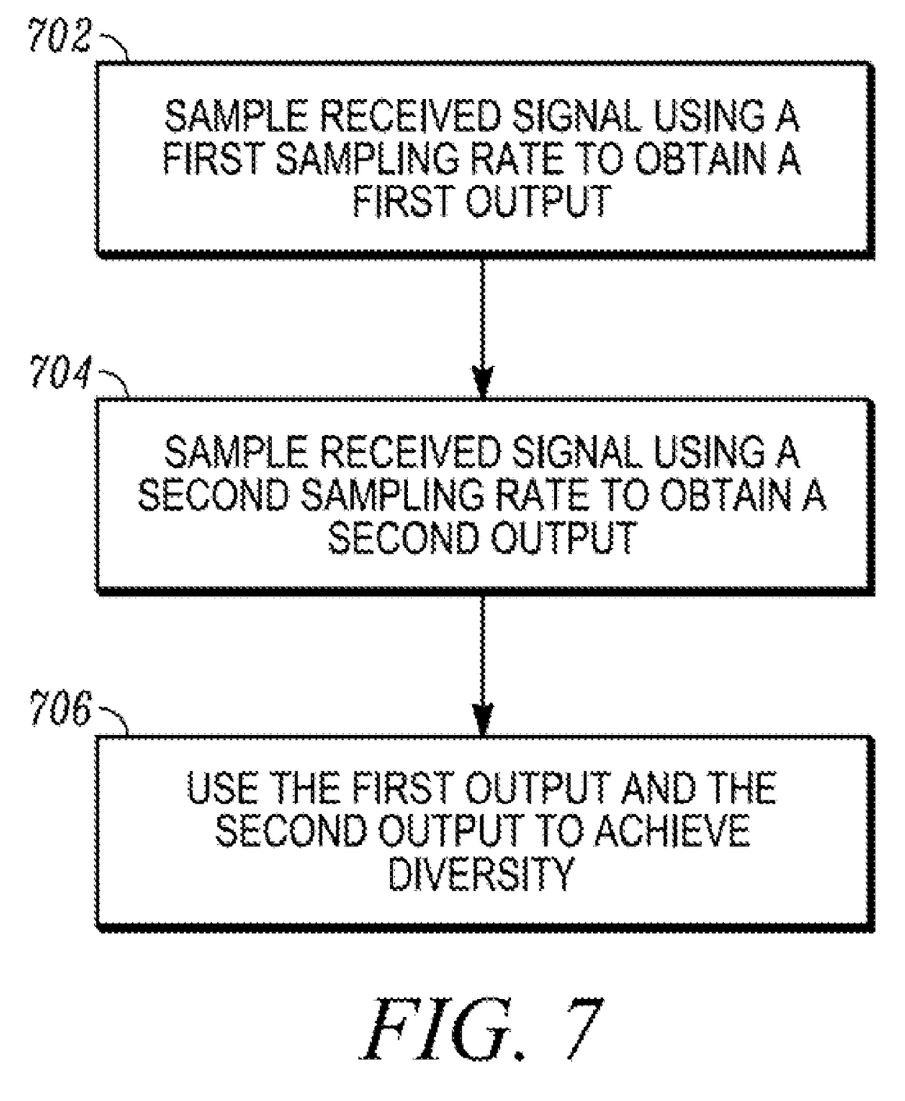
FIG. 7 is a flowchart illustrating an embodiment of a process for sampling a received signal using different sampling rates.

FIG. 7 is a flowchart illustrating an embodiment of a process for sampling a received signal using different sampling rates. In some embodiments, the process of FIG. 7 is included in the process of FIG. 5. In some embodiments, the process of FIG. 7 is implemented in BTS 200 of FIG. 2. At 702, a received signal is sampled using a first sampling rate to obtain a first output. In some embodiments, the received signal is a mobile communication carrier signal. Sampling the received signal includes converting the received signal from analog-to-digital. In some embodiments, the first sampling rate is at least in part determined using a clock such as clock 332 of FIG. 3A, and the sampling is performed by a converter such as converter 314 of FIG. 3A. At 704, the received signal is sampled using a second sampling rate to obtain a second output. Sampling the received signal includes converting the received signal from analog-to-digital. In some embodiments, the second sampling rate is at least in part determined using a clock such as clock 334 of FIG. 3A, and the sampling is performed by a converter such as converter 328 of FIG. 3A. At 706, the first output and the second output are used to achieve diversity. In some embodiments, achieving diversity by selecting the first or the second output as the desired output based on signal quality. For example, the first or the second output with a higher signal-to-noise ratio is selected. In some embodiments, achieving diversity includes combining at least a portion of the first output and the second output to determine desired information contained in the received signal.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing interferer diversity, comprising:
   processing, in a first receiver, a received wireless signal with an included interferer to obtain a first processed signal in which a desired information and interferer is translated to a first frequency and a first interferer frequency, respectively, in a first Nyquist zone; and
   processing, in a second receiver, the received wireless signal with the included interferer to obtain a second processed signal in which the desired information and interferer is translated to a second frequency and second interferer frequency, respectively, in the first Nyquist zone, wherein the second frequency is different than the first frequency, and wherein the second interferer frequency is different than the first interferer frequency.

2. A method as recited in claim 1, wherein processing the received wireless signal to obtain the first processed signal includes mixing the received wireless signal using a first local oscillator frequency, and processing the received wireless signal to obtain the second processed signal includes mixing the received wireless signal using a second local oscillator frequency different than the first local oscillator frequency.

3. A method as recited in claim 1, wherein processing the received wireless signal to obtain the first processed signal includes sampling the received wireless signal using a first sampling rate, and processing the received wireless signal to obtain the second processed signal includes sampling the received wireless signal using a second sampling rate different than the first sampling rate, and the first Nyquist zone associated with the first frequency is different than the first Nyquist zone associated with the second frequency.

4. A method as recited in claim 3, wherein sampling the received wireless signal includes performing analog-to-digital conversion using Harmonic Sampling.

5. A method as recited in claim 3, wherein the first sampling rate is at least in part determined using a first clock and the second sampling rate is at least in part determined using a second clock different than the first clock.

6. A method as recited in claim 1, wherein processing the received wireless signal to obtain the first processed signal includes mixing the received wireless signal using a first local oscillator frequency and sampling the received wireless signal using a first sampling rate, and processing the received wireless signal to obtain the second processed signal includes mixing the received wireless signal using a second local oscillator frequency different than the first local oscillator frequency and sampling the received wireless signal using a second sampling rate different than the first sampling rate.

7. A method as recited in claim 1, wherein processing the received wireless signal to obtain the first processed signal and processing the received wireless signal to obtain the second processed signal includes setting one or more components having a tunable setting in the first receiver or portion thereof to a different setting than a corresponding component in the second receiver or corresponding portion thereof.

8. A method as recited in claim 1, wherein the first frequency and the second frequency are first Nyquist zone frequencies resulting from analog-to-digital conversions of the received wireless signal.

9. A method as recited in claim 1, further comprising determining whether the first processed signal or the second processed signal has superior signal quality, and selecting the processed signal with the superior signal quality to use in determining the desired information.

10. A method as recited in claim 9, wherein the processed signal with the superior signal quality is associated with one or more of the following: a higher signal-to-noise ratio, a lower signal power, a higher signal power, and a larger difference between the frequency of the desired information and a frequency of an interferer.

11. A method as recited in claim 1, further comprising combining at least a portion of the first processed signal and at least a portion of the second processed signal to determine the desired information.

12. A method as recited in claim 1, wherein the desired information includes user data contained in a channel used for wireless mobile communication.

13. A method as recited in claim 1, wherein the first receiver and the second receiver are included in a Base Transceiver Station of a mobile network.

14. A method as recited in claim 1, wherein at least a portion of the first receiver and at least a portion of the second receiver are included on a single component attached via an electrical component slot.

15. A method as recited in claim 1, wherein the received wireless signal is received via a single radio antenna.

16. A method as recited in claim 1, wherein the received wireless signal is filtered and amplified before being used to obtain the first processed signal and the second processed signal.

17. A system for providing interferer diversity, comprising:
a communication interface configured to receive a wireless signal with an included interferer;
a first radio component configured to process the received wireless signal with the included interferer to obtain a first processed signal in which a desired information and interferer is translated to a first frequency and a first interferer frequency, respectively, in the first Nyquist zone; and
a second radio component configured to process the received wireless signal with the included interferer to obtain a second processed signal in which the desired information and interferer is translated to a second frequency and second interferer frequency, respectively, in the first Nyquist zone, wherein the second frequency is different than the first frequency, and wherein the second interferer frequency is different than the first interferer frequency.

18. A system as recited in claim 17, wherein the first radio component includes a first local oscillator used to mix the received wireless signal to obtain the first processed signal, and the second radio component includes a second local oscillator, different than the first local oscillator, used to mix the received wireless signal to obtain the second processed signal.

19. A system as recited in claim 17, wherein the first radio component includes a first clock used to sample the received wireless signal to obtain the first processed signal, and the second radio component includes a second clock, different than the first clock, used to sample the received wireless signal to obtain the second processed signal, and the first Nyquist zone associated with the first frequency is different than the first Nyquist zone associated with the second frequency.

20. A system as recited in claim 17, further comprising a signal processor configured to determine whether the first processed signal or the second processed signal has superior signal quality, and select the processed signal with the superior signal quality to use in determining the desired information.

21. A system as recited in claim 17, further comprising a signal processor configured to combine at least a portion of the first processed signal and at least a portion of the second processed signal to determine the desired information.

22. A computer program product for providing interferer diversity, the computer program product being embodied in a computer readable medium and comprising computer instructions for:
processing, in a first receiver, a received wireless signal with an included interferer to obtain a first processed signal in which a desired information and interferer is translated to a first frequency and a first interferer frequency, respectively, in a first Nyquist zone; and
processing, in a second receiver, the received wireless signal with the included interferer to obtain a second processed signal in which the desired information and interferer is translated to a second frequency and second interferer frequency, respectively, in the first Nyquist zone, wherein the second frequency is different than the first frequency, and wherein the second interferer frequency is different than the first interferer frequency.

23. A computer program product as recited in claim 22, wherein processing the received wireless signal to obtain the first processed signal includes mixing the received wireless signal using a first local oscillator frequency, and processing the received wireless signal to obtain the second processed signal includes mixing the received wireless signal using a second local oscillator frequency different than the first local oscillator frequency.

24. A computer program product as recited in claim 22, wherein processing the received wireless signal to obtain the first processed signal includes sampling the received wireless signal using a first sampling rate, and processing the received wireless signal to obtain the second processed signal includes sampling the received wireless signal using a second sampling rate different than the first sampling rate and the first Nyquist zone associated with the first frequency is different than the first Nyquist zone associated with the second frequency.

25. A computer program product as recited in claim 22, further comprising
   determining whether the first processed signal or the second processed signal has superior signal quality, and
   selecting the processed signal with the superior signal quality to use in determining the desired information.

26. A computer program product as recited in claim 22, further comprising combining at least a portion of the first processed signal and at least a portion of the second processed signal to determine the desired information.

\* \* \* \* \*